United States Patent [19]
Incorvia

[11] Patent Number: 6,071,436
[45] Date of Patent: Jun. 6, 2000

[54] CORROSION INHIBITORS FOR CEMENT COMPOSITIONS

[75] Inventor: Michael J. Incorvia, Lansdale, Pa.

[73] Assignee: GEO Specialty Chemicals, Inc., Cleveland, Ohio

[21] Appl. No.: 08/631,490

[22] Filed: Apr. 12, 1996

Related U.S. Application Data

[60] Provisional application No. 60/007,852, Dec. 1, 1995.

[51] Int. Cl.$^7$ .............................. C09K 3/00; C04B 9/02; C23F 11/00; B05D 1/36
[52] U.S. Cl. ............................ 252/392; 252/396; 422/7; 422/16; 422/17; 106/14.14; 106/14.18; 106/14.32; 106/14.42; 427/403
[58] Field of Search ................................... 422/7, 16, 17; 252/392, 396; 427/403; 106/14.14, 14.18, 14.35, 14.42

[56] References Cited

U.S. PATENT DOCUMENTS

| | | | |
|---|---|---|---|
| 2,793,130 | 5/1957 | Shannone et al. | 106/99 |
| 3,210,207 | 10/1965 | Dodson et al. | 106/90 |
| 3,374,174 | 3/1968 | Le Suer | 252/51.5 |
| 3,427,175 | 2/1969 | Angstadt et al. | 106/89 |
| 3,801,338 | 4/1974 | Whitaker | 106/90 |
| 3,907,578 | 9/1975 | Scherrer et al. | 106/14 |
| 3,976,494 | 8/1976 | Kudo et al. | 106/14 |
| 4,192,769 | 3/1980 | Jahnke | 252/389 R |
| 4,285,733 | 8/1981 | Rosenberg et al. | 106/98 |
| 4,318,744 | 3/1982 | Dodson | 106/90 |
| 4,337,299 | 6/1982 | Van Den Bergh | 428/562 |
| 4,362,586 | 12/1982 | Uffner et al. | 156/71 |
| 4,442,021 | 4/1984 | Buerge et al. | 252/389 |
| 4,482,384 | 11/1984 | Miller | 106/92 |
| 4,552,815 | 11/1985 | Dreher et al. | 428/415 |
| 4,737,193 | 4/1988 | Gutmann et al. | 106/88 |
| 4,738,994 | 4/1988 | Weiss | 523/401 |
| 4,780,111 | 10/1988 | Dorer et al. | 44/71 |
| 4,820,344 | 4/1989 | Geke | 106/14.13 |
| 4,888,132 | 12/1989 | Kohashi et al. | 252/393 |
| 4,971,721 | 11/1990 | Takahashi et al. | 252/314 |
| 4,990,184 | 2/1991 | Dotson et al. | 106/14.11 |
| 5,156,775 | 10/1992 | Blount | 252/609 |
| 5,226,956 | 7/1993 | Askew et al. | 106/14.05 |
| 5,239,047 | 8/1993 | Devore et al. | 528/339.3 |
| 5,262,089 | 11/1993 | Bobrowski et al. | 252/396 |
| 5,294,649 | 3/1994 | Gerber | 523/145 |
| 5,364,927 | 11/1994 | Devore et al. | 528/339.3 |
| 5,372,643 | 12/1994 | Gosset et al. | 106/808 |
| 5,599,481 | 2/1997 | Walger | 252/358 |
| 5,641,352 | 6/1997 | Jeknavorian et al. | 106/808 |

OTHER PUBLICATIONS

Encyclopedia of Polymer Science and Engineering, vol. 6, Emulsion Polymerization to Fibers, Manufacture, "1,2–Epoxide Polymers," pp. 254–259 (1986).

"Cement", Encyclopedia of Chemical Technology (Kirk–Othmer, eds., John Wiley & Sons, Inc., NY, NY 5th ed., 1993).

*ACI Manual of Concrete Practice Part 1—1995* (American Concrete Institute; Detroit, MI 1995).

Encyclopedia of Polymer Science & Engineering, vol. 10, pp 597–615 (John Wiley & Sons, Inc., NY, NY 1969).

*Primary Examiner*—C. H. Kelly
*Attorney, Agent, or Firm*—Rankin, Hill, Porter & Clark LLP

[57] ABSTRACT

Compositions and methods relating to cementitious compositions are provided. The addition of an amidoamine that is the reaction product of polyalkylenepolyamines and short-chain alkanedioic acids or reactive derivatives thereof to cementitious compositions has been found useful in inhibiting the corrosion of ferrous metal articles in contact with said composition. The amidoamine is advantageously employed in combination with a hydrophobe compound that enhances corrosion inhibition. The invention also provides aqueous emulsions which contain the amidoamine, one or more hydrophobes, and an emulsifier for the hydrophobe.

24 Claims, No Drawings

CORROSION INHIBITORS FOR CEMENT COMPOSITIONS

CROSS-REFERENCE TO RELATED APPLICATIONS

This application claims priority from U.S. provisional application Ser. No. 60/007852, filed Dec. 1, 1995, the disclosure of which is incorporated herein by reference.

FIELD OF THE INVENTION

This invention relates to corrosion inhibitors useful as additives to cement compositions for inhibiting the corrosion of steel reinforcing structures in contact therewith.

BACKGROUND ART

Concretes formed from hydraulic cements, of which Portland cement is the most common example, are used as structural components in various applications, such as in the formation of roads, bridge deckings, building structures, multi-story automobile storage structures and the like. In order to enhance the properties of the concrete to permit its use in these structures, the material normally is used in combination with iron or steel reinforcing structures therein. These reinforcing metal structures, usually in the form of metal rods or bars, are subjected to attack by the various corrosive elements contained in the concrete, as well as by the application of external corrosive elements to the structure, such as chloride salts and the like, which are commonly used in the removal of ice and snow from roads, bridges, pedestrian walkways and the like. Further, various structures located at coastal installations and the like are subject to corrosive salt attack from the marine environment. The repair and replacement of such structures which have deteriorated due to the effects of such corrosive forces is extensive and in certain instances requires complete replacement of the structure as unsuitable for its intended use.

In attempts to counteract the corrosive effects normally encountered by concrete structures, as discussed above, various corrosion inhibiting agents have been proposed for use as admixtures to be used in their formation.

U.S. Pat. No. 3,210,207 (Dodson et al.) discloses the use of mixes of calcium formate with minor amounts of certain benzoate, nitrite or chromate salts as corrosion inhibitors, to be used as accelerators in cements.

U.S. Pat. No. 3,427,175 (Angstadt et al.) discloses the use of calcium nitrite as an accelerator which partially inhibits corrosion in alite cements. The calcium nitrite may contain minor amounts of sodium nitrite and may be used with calcium chloride and other accelerators.

U.S. Pat. No. 3,801,338 (Whitaker) discloses the use of a mixture of calcium formate and sodium nitrite, optionally with triethanolamine or sodium benzoate, for adding to cement which is to contain metal reinforcement. Improved compressive strength is taught, together with sulfate resistance, and a positive corrosion inhibition effect.

U.S. Pat. No. 3,976,494 (Kudo et al.) discloses a process for inhibiting corrosion of iron or steel placed in cement which comprises adding to the cement a nitrite and an ester of phosphoric acid and/or and ester of boric acid.

U.S. Pat. No. 4,285,733 (Rosenberg et al.) discloses the addition of at least about 2% calcium nitrite to concrete to inhibit the corrosion of metal pieces contained therein.

U.S. Pat. No. 5,262,089 (Bobrowski et al.) discloses an admixture for inhibiting chloride-induced corrosion in steel reinforcing in place in concrete comprises an oil-in-water emulsion wherein the oil phase comprises an unsaturated fatty acid ester and ethoxylated nonyl phenol and the ester of an aliphatic carboxylic acid with a mono-, di- or trihydric alcohol and the water phase comprises a saturated fatty acid, an amphoteric compound, a glycol and a soap. The admixture is added to the concrete prior to placement.

U.S. Pat. No. 4,442,021 (Burge et al.) discloses that corrosion protection of metallic articles within concrete structures can be accomplished by coating the articles with a coating comprising an aqueous suspension of 10–99.99% of hydraulic binding agents, preferably cement or mixtures thereof with latent hydraulic additives, and 0.01–10% corrosion inhibitors. The coating is applied onto the metallic articles intended to be enclosed in concrete structures.

SUMMARY OF THE INVENTION

This invention relates to a cementitious composition comprising a hydratable cementitious material in a major amount by weight and an amidoamine corrosion inhibitor in a minor amount by weight of said cementitious composition. The amount of amidoamine should be effective to inhibit the corrosion of ferrous metal, e.g. iron or steel, articles placed therein. In preferred compositions, from about 0.01 to about 5% by weight of amidoamine based on weight of cement is present.

In a related aspect, this invention relates to a method of inhibiting the corrosion of ferrous metal articles in contact with a cured cementitious composition comprising mixing a minor amount by weight of an amidoamine with a major amount by weight of a hydratable cementitious composition comprised of a cement and water and placing the resulting cementitious composition in contact with ferrous metal articles.

In another aspect, this invention relates to a blend composition that is useful for inhibiting corrosion of ferrous metal articles in contact with a cementitious composition said blend comprising a major amount of an amidoamine and a minor amount of hydrophobe compound. In a related aspect, this invention relates to an aqueous emulsion comprised of water, an amidoamine, a hydrophobe, and an emulsifier for said hydrophobe.

This invention also relates to a method of inhibiting the corrosion of ferrous metal articles comprising contacting ferrous metal articles with an amidoamine, said amidoamine being the reaction product of a polyalkylenepolyamine and a short-chain alkanedioic acid or reactive derivative thereof.

This invention also relates to a composition of matter comprising the reaction product of polyalkylenepolyamine and a short-chain alkanedioic acid, or reactive derivative thereof, in a molar ratio of polyalkylenepolyamine to short-chain alkanedioic acid, or reactive derivative thereof, of greater than 1.4:1.

DETAILED DESCRIPTION OF THE INVENTION

The amidoamines useful in this invention can be described as oligomeric polyamides having primary amine functionality and which are the reaction product of polyalkylenepolyamines and short-chain alkanedioic acids or reactive derivatives thereof. The reaction product will typically be a complex mixture, but will also typically contain amidoamines represented by the formula:

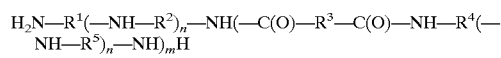

wherein $R^1$, $R^2$, $R^3$, $R^4$, and $R^5$ are alkylene radicals and n and m are integers (for pure compounds) independently selected from about 1 to about 20, more typically from about 1 to about 5. Of course, for mixture of compounds, n and m can be fractions or complex numbers which represent averages for the mixture. When m is greater than 1, each $R^3$ can be the same alkylene group or, if a mixture of alkanedioic acids are employed, the $R^3$ groups in a given compound can be different alkylene groups. The reaction product will typically be comprised predominantly (i.e. at least 50% by weight of the reaction product) of amines of the above formula. In addition to amines of the above formula, amines having a similar formula, but wherein a portion of the secondary amine groups of the polyalkylenepolyamine have reacted with the carboxyl group of the alkanedioic acid reactant, may also be present. Further, amines of the above formula may also self-condense to form substituted imidazolines that will typically be present in the reaction mixture.

The reaction mixture can also be treated with an alkylating agent, e.g. methyl chloride, dimethyl sulfate, etc., to convert at least a portion (e.g. from 1% to about 25%) of the amine nitrogen functionality of the amidoamine to a quaternary amine. Preferred amidoamines are unquaternized.

Polyalkylenepolyamines which can be used according to the invention are those which have two primary amine groups and at least one secondary amine group. The amidoamines are typically prepared from polyalkylenepolyamines of the formula $H_2N-R(-NH-R)_n-NH_2$ wherein n is 1 to 20, more typically from 1 to 5, and R is an alkylene group. Typically R contains 2 to 8 carbon atoms and the total carbon atoms of the polyamine typically do not exceed 12. The polyalkylenepolyamines have at least one secondary amine group. Examples of polyalkylenepolyamines include diethylenetriamine, triethylenetetramine, tetraethylenepentamine, pentaethylenehexamine, dipropylenetriamine, tributylenetetramine, dihexamethylenetriamine and the like. The more preferred polyalkylenepolyamines are the polyethylene polyamines with the most preferred being triethylenetetramine and diethylenetriamine.

The amidoamines are prepared from short-chain alkanedioic acids or reactive derivatives thereof, e.g. the di-lower alkyl (e.g. $C_1-C_3$) esters of said alkanedioic acid. The short-chain alkanedioic acids are to be distinguished from dimer acids, and generally have less than about 22 carbon atoms. The short-chain alkanedioic acid typically has from 2 to 14 carbon atoms, and more typically has from 3 to 10 carbon atoms. Especially useful short-chain alkanedioic acids will have 4 to 8 carbon atoms and examples include succinic, glutaric and adipic acids. Also useful are saturated acids having 9 to 12 carbon atoms, e.g. azelaic acid and sebacic acid. The dicarboxylic acid esters which are typically used in the process according to the invention are those which are $C_{1-3}$ diesters of $C_{1-10}$ dicarboxylic acids. Such diesters can be made for example, by direct esterification of a dicarboxylic acid, e.g. those having from 1 to 10 carbon atoms with an alcohol, e.g. those having from 1 to 3 carbon atoms. Examples of such esters of short-chain alkanedioic acids are dimethyl malonate, dimethyl succinate, dimethyl glutarate, dimethyl adipate, dimethyl pimelate, dimethyl azelate, and dimethyl sebacate. Mixtures of any or all of such esters can also be used in the process according to the invention. Preferably, the esters are mixtures of dimethyl adipate and dimethyl glutarate which are sold as DBE-3™, a product of the DuPont Corporation.

The aminoamide can be made by a process whose first step is the aminolysis of an ester. A $C_{1-3}$ dialkyl ester of a saturated aliphatic dicarboxylic acid having from 3 to 10 carbon atoms is heated with a polyalkylenepolyamine having two primary amine groups and at least one secondary amine group in the absence of water. The polyalkylenepolyamine to ester molar ratio should be greater than 1:1 to ensure that the product is essentially completely amine functional and to ensure that the product is an oligomer rather than a high polymer. Typically, the molar ratio of polyalkylenepolyamine to ester will range from about 1.1: to about 5:1, more typically from about 1.3:1 to about 2:1. Using these mole ratios, the product will typically be comprised predominantly (i.e. at least 50% by weight) of compounds described by the above formula wherein m is 2–12, more typically wherein m is 2–5.

During the heating step, the reaction temperature first reaches a maximum of about 150° C.–160° C. at which point the alcohol formed as a result of the reaction between the diester and the polyalkylenepolyamine begins to boil. The alcohol is retained in the reaction by refluxing it which also lowers the reaction temperature. After the temperature drops to about 110° C.–115° C., the alcohol is removed from the reaction at a temperature of from about 110° C. to about 160° C. The alcohol removal is continued until the reaction mixture is substantially free of ester functionality.

The molar ratio of polyalkylenepolyamine to ester in the aminolysis step should be greater that 1:1. Values less than 1:1 will result in gelation of the reaction product. Typically, the molar ratio of polyalkylenepolyamine to alkanedioic acid or reactive derivative thereof is from about 1.3:1 to about 4:1, more typically from about 1.5:1 to about 3:1, and even more typically from about 1.5:1 to about 2.5:1.

Preferably, the ester-polyalkylenepolyamine reaction mixture is heated at atmospheric pressure in a reaction vessel equipped with a reflux condenser until the temperature first reaches a value of about 150° C.–160° C. during which time the alcohol formed in the reaction begins to reflux. The alcohol generated lowers the boiling point of the reaction mixture and the temperature continuously falls as more and more alcohol is produced. When the reaction temperature drops to about 110° C., the alcohol is removed at a temperature in the range of from about 110° C. to about 160° C. The alcohol removal can be accomplished by changing the condenser configuration from reflux to take-off. Alcohol is continuously removed until the reaction product is essentially free of ester functionality. Because it has been found that product gelation results if the molar ratio of polyalkylenepolyamine to ester is less than 1:1, it is important to insure that substantially all of polyalkylenepolyamine reacts before the alcohol formed in the reaction is removed.

When the molar ratio of polyalkylenepolyamine to alkanedioic acid or reactive derivative thereof is greater than 1.4:, it is believed that the reaction product itself is novel. Thus, this invention also relates to compositions which are the reaction product of polyalkylenepolyamine and an alkanedioic acid or reactive derivative thereof, wherein the molar ratio of polyalkylenepolyamine to alkanedioic acid or reactive derivative thereof is greater than 1.4. Typically, the molar ratio of polyalkylenepolyamine to alkanedioic acid or reactive derivative thereof is greater than about 1.5:1, more typically greater than about 1.6:1, and even more typically greater than about 1.7:1.

The aminoamide composition may be added to a cementitious composition, e.g. a cement or a concrete mix, at any convenient point during its preparation, after which point substantial mixing will take place. The aminoamide may be added to the water in which the cement, sand and/or gravel are mixed. The cement may be premixed with water and then either a neat or aqueous aminoamide composition may be added. In general, either a neat or aqueous aminoamide composition may be added to the cement, mortar or concrete mix at any stage prior to final mixing of the cementitious composition.

Cementitious compositions are cements, mortars, or concrete mixes which include concretes, mortars, neat paste compositions, oil well cement slurries, grouting compositions and the like. Cementitious compositions are discussed in the encyclopedia article "Cement" cited below. The cements used in the preparation of the cementitious compositions, especially concrete mixes, include Type I, II and III cements. These cements are well known and are described in "Cement", *Encyclopedia of Chemical Technology*, (Kirk-Othmer, eds, John Wiley & Sons, Inc., N.Y., N.Y., 5th ed., 1993), vol. 5, pp. 564–598, the disclosure of which is incorporated by reference herein. Portland cement is by far the most widely used hydraulic cement. The term "hydraulic cement" as used herein includes those inorganic cements which, when mixed with water, set and harden as a result of chemical reactions between the water and the compounds present in the cement. The term "Portland cements" as used herein includes those products prepared by heating a mixture of limestone and clay or shale, or other calcareous and argillaceous materials to a fused state and grinding the fused product, which is called clinker, with a few percent, normally about 4 to 6 percent, of a retarder such as gypsum. The term "concrete" as used herein includes a mixture of such hydraulic cements and inert aggregates. Typical aggregates include conventional aggregates such as gravel, sand, granite, limestone, and quartz. Conventional hydraulic cement concretes, e.g. Portland cement concretes, employ major amounts, i.e. over 50%, usually up to about 75% by volume of such aggregates in the set product. Pozzolanic materials such as condensed silica fume and fly ash may also be included. The cements may be used to prepare concrete mixes typically containing 100 parts by weight of cement, from about 140 to about 260 parts by weight of sand, from about 100 to about 200 parts by weight of gravel, from about 20 to about 80 parts by weight of water and an amount of the aminoamide composition of the invention effective to inhibit the corrosion of ferrous metal articles placed into the cementitious composition prior to curing thereof. Typical concrete mixes contain 100 parts by weight of cement, from about 160 to about 240 parts by weight of sand, from about 120 to about 180 parts by weight of gravel, from about 35 to about 60 parts by weight of water and from about 0.1 to about 5 parts by weight of the aminoamide composition of this invention. Further information on the formulation and processing of concrete is found in the *ACI Manual of Concrete Practice Part 1—1995*, (American Concrete Institute, Detroit, Mich., 1995) the disclosure of which is incorporated herein by reference.

The concentration of aminoamide composition of this invention in the cementitious composition may vary, but will generally be less than about 5%, typically from about 0.1% to about 3%, and preferably from about 0.5% to about 1.5% (by weight of cement). After preparation, these cementitious compositions are then allowed to harden to obtain a hardened cement mass.

In preferred embodiments of this invention, one or more hydrophobes are also present in the cementitious composition along with the aminoamide composition of the invention. Useful hydrophobes are organic compounds having at least 6 carbon atoms, typically from about 10 to 50, more typically from about 12 to about 40 carbon atoms. The hydrophobe will also typically have essentially no hydrophilic groups such that the HLB of the hydrophobe will typically be less than about 1. Typical hydrophobes are primary, secondary or tertiary amines, fatty acid esters, fatty acid amides, and fatty alcohols wherein the compound contains no ionic groups, e.g. carboxylates, sulfonates, quaternary amines, or the like, or hydrophilic polyether groups, e.g. polyoxyethylenes. Examples of hydrophobes include the methyl esters of soybean oil fatty acids, tallow fatty acid, tall oil fatty acids, coconut oil fatty acids, lauric acid, caprylic acid, oleic acid, isostearic acid and dimer fatty acids. Other examples include the amino-functional fatty polyamides or fatty aminoamides as described in *The Encyclopedia of Polymer Science and Technology*, vol. 10, pp. 597–615 (John Wiley & Sons, Inc, N.Y., N.Y., 1969) the disclosure of which is incorporated herein by reference. These amino-functional polyamides or fatty aminoamides are the reaction product of a polymeric fatty acid, e.g. a mixture comprised predominantly of a $C_{36}$ dimer acid, a fatty mono-acid (as a chain stopper to limit the molecular weight) and a polyalkylenepolyamine. Typically, the amino-functional polyamide will be a liquid fatty polyamide with an amine number of 200 to 600, more typically from about 300 to about 500 and even more typically from about 350 to about 400.

Preferred hydrophobes are mono-, di-, or tri-alkyl amines, e.g. tri-laurylamine. Preferred amines have at least about 12 total carbon atoms. The preferred amines are tri-alkyl fatty amines wherein each fatty alkyl group has at least 6 carbon atoms, more preferably from about 8 to about 22 carbon atoms each, and more typically from about 10 to about 14 carbon atoms each. Mixtures of any of the above compounds may also be used as hydrophobes.

The relative amounts of amidoamine and hydrophobe may vary broadly, but the amidoamine will generally be present in a greater amount by weight than the hydrophobe. Typically, the hydrophobe will be present in an amount of about 0.01% to about 40% by weight of the amidoamine, more typically from about 0.1% to about 10%, and preferably from about 1% to about 5%.

The amidoamine and the hydrophobe can be added to the cementitious composition separately or they can be premixed to form a blend composition. The blend can be used either as a neat blend or as an aqueous dispersion or emulsion of the components. Efficient dispersion of the blend in water at relatively low blend solids, e.g. 20% to 50% blend solids, facilitates dispersion of the blend throughout the cementitious composition. Thus, the blend is preferably added to the cementitious composition as an aqueous dispersion which contains typically roughly equal amounts by weight of water and aminoamide and a minor amount by weight of the blend of a hydrophobe and a dispersant therefor. The dispersant can be any composition effective to disperse the desired amount of hydrophobe in the water. Examples of dispersants include surfactants, including nonionics, e.g. block copolymers of propylene and ethylene oxides, ethoxylated nonylphenols, ethoxylated fatty alcohols, anionics, e.g. fatty alcohol sulfates, and cationics, e.g. fatty alkyl quaternary amines. The amount of emulsifier will typically be small in comparison to the other components, e.g. from about 0.01% to about 5% by weight of the hydrophobe, more typically from about 0.05% to about 0.5%.

It has been found that the preferred hydrophobes, i.e. the fatty tri-alkyl amines, can be difficult to emulsify. It has been further found that the use of a second hydrophobe which is easier to disperse, e.g. an amino-functional fatty polyamide or fatty aminoamide, is beneficial. The fatty tri-alkyl amine can be pre-mixed with the amino-functional fatty polyamide or fatty aminoamide before mixing of the hydrophobes with water.

While the primary use of the aminoamides of this invention is as an additive to a cementitious composition to inhibit the corrosion of ferrous metal articles placed therein, the aminoamide should be useful as a corrosion inhibitor for ferrous metal articles in other fields of application, e.g. in petroleum production and/or processing, in protective coatings, and the like.

For a fuller understanding of the nature and advantages of this invention, reference may be made to the following examples. These examples are given merely to illustrate the invention and are not to be construed in a limiting sense. While the invention has been described with reference to certain specific embodiments thereof, it is understood that it is not to be so limited since alterations and changes may be made therein which are within the full intended scope of the appended claims. In this specification and the appended claims, all quantities, proportions and percentages are by weight (with a "major amount" referring to at least 50% by weight and a "minor amount" referring to less than 50% by weight) and all references to temperature are ° C. unless otherwise indicated.

EXAMPLES

Example 1

The synthetic procedure for an aminoamide is as follows. Charge a 1 liter resin kettle, fitted with a mechanical stirrer, a thermocouple, and a distilling receiver with a condenser, with 346 g of DuPont DBE-3 (89 wt % dimethyl adipate, 10 wt % dimethyl glutarate, 0.2 wt % dimethyl succinate, and 0.05 wt % methanol, and 0.04 wt % water) and 412 g diethylenetriamine. Maintain a dry nitrogen gas atmosphere over the reaction mixture. Heat the mixture up to reflux (approximately 150° C.) and hold at reflux, the reflux temperature will decrease as the reactants are converted to products. After approximately 20 minutes of reflux, begin collecting the methanol distillate. The temperature of the reaction mixture will rise as the methanol is collected, maintain the reaction temperature so as not to exceed 150° C. Typically 90% of the theoretically excepted methanol (115 g) can be collected by a simple distillation, the remaining 10% can be collected by either a nitrogen sweep or reduced pressure distillation. The final product is a yellow paste at room temperature. The final product typically contains less than 0.1 wt % free methanol, free diethylenetriamine of 25 wt % or less, and free dimethyl esters of 0.2 wt % or less.

Example 2

The above synthesis of Example 1 is repeated, but the amount of diethylenetriamine is reduced to obtain a molar ratio of diethylenetriamine to total diester of 1.3:1. The final product is an extremely viscous, yellow liquid which barely flows at room temperature. The final product has around 10%(w/w) or less free diethylenetriamine.

Example 3

A concrete can be made by adding 10 g of a 50% aqueous solution of the product of Example 1 to a concrete consisting of water, 260 g (12.25%); cement, Portland type I, 500 g (23.55%); and Ottawa Sand 1,363 g (64.20%).

Example 4

A concrete can be made by adding 10 g of a 50% aqueous solution of the product of Example 2 to a concrete consisting of water, 260 g (12.25%); cement, Portland type I, 500 g (23.55%); and Ottawa Sand 1,363 g (64.20%).

Example 5

An aqueous emulsion is prepared by the following procedure. To a beaker add: 95.3 g of the product of Example 1,3.0 g of an amine-functional polyamide resin based on dimer fatty acid (available from Henkel Corporation, Ambler, Pa., as Genamid® 490), 2.0 g tri-lauryl amine (available from Henkel Corporation, Tucson, Ariz., as Alamine® 304-1), and 100 g of a surfactant solution (prepare surfactant solution by adding 0.78 g Pluronice F-88 nonionic block copolymer of propylene and ethylene oxides having an HLB of 24.0 available from BASF Performance Chemicals, Parsippany, N.J.) in 881 g deionized water). The mixture is emulsified using a high shear homogenizer.

Example 6

A concrete can be made by adding 10 g of a 50% aqueous emulsion of Example 5 to a concrete consisting of water, 260 g (12.25%); cement, Portland type I, 500 g (23.55%); and Ottawa Sand 1,363 g (64.20%).

Example 7

An aqueous emulsion is prepared by the following procedure. To a beaker add: 95.3 g of the product of Example 2,3.0 g of an amine-functional amidoamine resin (available from Henkel Corporation, Ambler, Pa., as Genamid 490), 2.0 g tri-lauryl amine (available from Henkel Corporation, Tucson, Ariz., as Alamine 304-1), and 100 g of a surfactant solution (prepare surfactant solution by adding 0.78 g of nonionic block copolymer of propylene and ethylene oxides having an HLB of 24.0, available from BASF Corp. as Pluronic F-88, in 881 g deionized water). The mixture is emulsified using a high shear homogenizer.

Example 8

A concrete can be made by adding 10 g of a 50% aqueous emulsion of Example 7 to a concrete consisting of water, 260 g (12.25%); cement, Portland type I, 500 g (23.55%); and Ottawa Sand 1,363 g (64.20%).

Example 9

Rebar (diameter of 1 cm) was wire brushed to remove any corrosion products, rinsed with deionized water, cleaned in an ultrasonic bath to remove any dust adhering from the wire brushing, and washed with acetone to remove any organic oils. The ends of the bar are then coated with sealing wax to expose a fixed surface area for corrosion testing. Concrete mixtures are then prepared according to ASTM C305, practice for mechanical mixing of hydraulic cement pastes and mortars of plastic consistency. "Lollipop" specimens are cast with both treated (1% w/w activities of admixture vs. cement) and untreated concrete. The prepared rebar is mounted (suspended) in the middle of a, 5 cm (diameter) by 10 cm, cylindrical mold, this geometry provides nearly a 1 inch cover of concrete on all sides to the rebar. The concrete is cured at room temperature (approximately 23° C.) at approximately 100% RH for seven days.

Each specimen is then pounded in a 1.5% (w/w) sodium chloride solution for two weeks prior to electrochemical testing by means of a potentiodynamic technique. EG&G Instruments, Princeton Applied Research Division, hardware (models 273, 273A, or VersaStat™) and software (252 or 352) were used. The electrolyte was the 1.5% (w/w) NaCl solution, the working electrode the steel reinforcing bar embedded in concrete, the counter electrode was a high density carbon electrode, the reference electrode calomel electrode in a luggin probe. The potentiodynamic scan was from −0.250 volts versus the open circuit potential to 1.0 volt versus the reference electrode. The equilibrium corrosion potential ($E_{corr}$) and corrosion current density ($i_{corr}$) were determined. The more positive the values of $E_{corr}$ indicate that corrosion is less likely to thermodynamically occur. The equilibrium corrosion current density indicates the kinetic rate of corrosion, the lower the value of $i_{corr}$ the smaller the rate of corrosion. The following data shows that the aminoamide formulation of Example 1 protects the reinforcing bar embedded in concrete and exposed to high chloride ion levels thermodynamically ($E_{corr}$) and kinetically ($i_{corr}$) protects the steel from corrosion attack compared to (purified) calcium nitrite, a commercial comparative, and an untreated control.

| Admixture | $E_{corr}$ (millivolts) | $i_{corr}$ ($10^{-5}$ amps/cm$^2$) |
|---|---|---|
| Example 1 | −413 | 3.38 |
| Calcium Nitrite | −517 | 3.86 |
| Commercial Comparative | −456 | 4.06 |
| Untreated (control) | −446 | 4.26 |

What is claimed is:

1. A method of inhibiting the corrosion of ferrous metal articles a cementitious composition containing comprising contacting ferrous metal articles with a cementitious composition containing an amidoamine, said amidoamine being the reaction product of a polyalkylenepolyamine and a short-chain alkanedioic acid or reactive derivative thereof in a molar ratio of polyalkylenepolyamine to short-chain dioic acid or reactive derivative thereof greater than 1.3:1, said reaction product being comprised of an amidoamine represented by the formula:

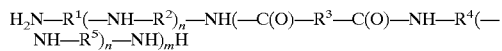

wherein $R^1$, $R^2$, $R^3$, $R^4$, and $R^5$ are alkylene radicals and n and m are independently selected from 1 to about 20.

2. A method as claimed in claim 1 wherein n and m are independently selected from about 1 to about 5.

3. A method as claimed in claim 1 wherein the reaction product is at least 50% by weight of amidoamines of the said formula.

4. A method as claimed in claim 1 wherein said polyalkylenepolyamine has the formula H$_2$N—R(—NH—R)$_n$—NH$_2$ wherein n is 1 to 20, R is an alkylene group having from about 2 to about 8 carbon atoms.

5. A method as claimed in claim 4 wherein the total carbon atoms of said polyalkylenepolyamine do not exceed 12.

6. A method as claimed in claim 4 wherein n is from 1 to 5.

7. A method as claimed in claim 1 wherein said polyalkylenepolyamine is selected from the group consisting of diethylenetriamine, triethylenetetramine, tetraethylenepentamine, pentaethylenehexamine, dipropylenetriamine, tributylenetetramine, and dihexamethylenetriamine.

8. A method as claimed in claim 1 wherein said polyalkylenepolyamine is selected from the group consisting of triethylenetetramine and diethylenetriamine.

9. A method as claimed in claim 1 wherein said short-chain alkanedioic acid or reactive derivative thereof is selected from the group consisting of alkanedioic acids having from 2 to 14 carbon atoms and di C$_1$–C$_3$ alkyl esters thereof.

10. A method as claimed in claim 9 wherein said short-chain alkanedioic acid or reactive derivative thereof is a short-chain alkanedioic acid having from 3 to 10 carbon atoms.

11. A method as claimed in claim 9 wherein said short-chain alkanedioic acid has from 4 to 8 carbon atoms.

12. A method as claimed in claim 11 wherein said short-chain alkanedioic acid is selected from the group consisting of succinic, glutaric and adipic acids.

13. A method as claimed in claim 9 wherein said short-chain alkanedioic acid or reactive derivative thereof is a di C$_1$–C$_3$ alkyl ester of a C$_3$–C$_{10}$ dicarboxylic acid.

14. A method as claimed in claim 13 wherein said di C$_1$–C$_3$ alkyl ester of a C$_3$–C$_{10}$ dicarboxylic acid is selected from the group consisting of dimethyl malonate, dimethyl succinate, dimethyl glutamate, dimethyl adipate, dimethyl pimelate, dimethyl azelate, dimethyl sebacate, and mixtures thereof.

15. A method as claimed in claim 14 wherein said di C$_1$–C$_3$ alkyl ester is a mixture of dimethyl adipate, and dimethyl glutamate.

16. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.3:1 to about 4:1.

17. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.5:1 to about 3:1.

18. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.5:1 to about 2.5:1.

19. A method of inhibiting the corrosion of ferrous metal articles in cementitious compositions comprising contacting a ferrous metal article with a hydratable cementitious composition containing an amidoamine, said amidoamine being a reaction product of a polyalkylenepolyamine selected from the group of polyalkylenepolyamines having the formula H$_2$N—R(—NH—R)$_n$—NH$_2$ wherein n is 1 to 20 and R is an alkylene group having from about 2 to about 8 carbon atoms, and a short-chain alkanedioic acid or reactive derivative thereof, selected from the group consisting of alkanedioic acids having less than 22 carbon atoms and di-C$_1$–C$_3$ alkyl esters thereof, in a molar ratio of from about 1.3:1 to about 4:1.

20. A method as claimed in claim 19 wherein said polyalkylenepolyamine is selected from the group consisting of triethylenetetramine and diethylenetriamine and said short-chain alkanedioic acid or reactive derivative thereof, is selected from the group consisting of alkanedioic acids having less than about 4–8 carbon atoms and di-C$_1$–C$_3$alkyl esters thereof.

21. A method as claimed in claim 1 wherein said reaction product is comprised of at least 50% by weight of an amidoamine represented by said formula.

22. A method as claimed in claim 14 wherein said di C$_1$–C$_3$ alkyl ester in a mixture of dimethyl adipate, dimethyl gultarate and dimethyl succinate.

23. A method of inhibiting the corrosion of ferrous metal articles in a hydratable cementitious method comprising contacting a ferrous metal article with a hydratable cementitious method containing an amidoamine, said amidoamine being the reaction product of a polyalkylene polyamine and a short-chain alkanedioic acid having less than 22 carbon atoms in a molar ratio of polyalkylenepolyamine to short-chain dioic acid greater than abut 1.3:1 to about 4:1, said reaction product being comprised of at least 50% by weight of said reaction product, of an amidoamine represented by the formula:

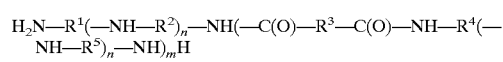

$$H_2N-R^1(-NH-R^2)_n-NH(-C(O)-R^3-C(O)-NH-R^4(-NH-R^5)_n-NH)_mH$$

wherein $R^1$, $R_2$, $R^3$, $R^4$ and $R^5$ are alkylene radicals and n and m are independently selected from 1 to about 5.

24. A method of inhibiting the corrosion of ferrous metal articles in a hydratable cementitious composition comprising contacting a ferrous metal article with a hydratable cementitious composition containing an amidoamine, said amidoamine being the reaction product of a polyalkylene polyamine and a di-$C_1$–$C_3$ alkyl ester of a alkanedioic acid having from 2 to 14 carbon atoms in a molar ratio of polyalkylenepolyamine to alkanedioic acid greater than about 1.3:1 to about 5:1, said reaction product being comprised of at least 50% by weight of said reaction product, of an amidoamine represented by the formula:

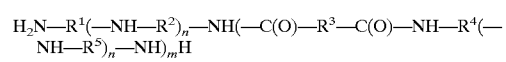

$$H_2N-R^1(-NH-R^2)_n-NH(-C(O)-R^3-C(O)-NH-R^4(-NH-R^5)_n-NH)_mH$$

wherein $R^1$, $R_2$, $R^3$, $R^4$ and $R^5$ are alkylene radicals and n and m are independently selected from 1 to about 5.

* * * * *